Oct. 13, 1931.          D. DYRESEN          1,827,309

FASTENER UNIT

Filed July 14, 1928

Inventor:
Didrick Dyresen
by Emery, Booth, Janney & Varney
Attys

Patented Oct. 13, 1931

1,827,309

UNITED STATES PATENT OFFICE

DIDRICK DYRESEN, OF SOMERVILLE, MASSACHUSETTS

FASTENER UNIT

Application filed July 14, 1928. Serial No. 292,647.

My invention aims to provide improvements in fastener units particularly adapted for securing upholstery panels to framework.

In the drawings which illustrate several embodiments of my invention:—

Figure 1:
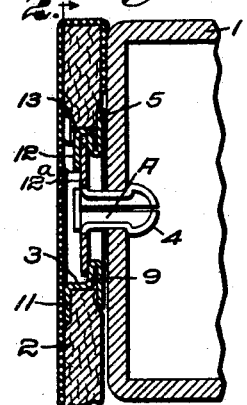
Figure 1 is an enlarged vertical section taken through an installation showing the manner of use of one form of fastener unit.

Referring to the drawings, I have shown three different constructions of fastener holding and attaching elements by means of which stud members are assembled with an upholstered backing of an upholstery installation.

Heretofore, this general type of unit, which was attached to a relatively stiff backing so that the base of the stud member was located between the faces, was not particularly suited for attachment by an automatic machine, because of the irregularity of the periphery of the attaching means.

With the units which I have illustrated in the drawings of the present application, it should be noted that each unit has a flange portion which presents a continuous peripheral portion. Therefore, these units are particularly adapted to be fed through an automatic machine without interfering with one another.

With the above mentioned advantages in mind I will now proceed to a description of the various devices illustrated.

Figure 2:
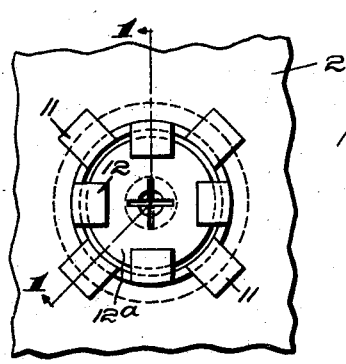
Fig. 2 is a section taken on the line 2—2 of Fig. 1 showing the fastener holding and attaching part secured to the relatively stiff carrying medium.
Figure 3:
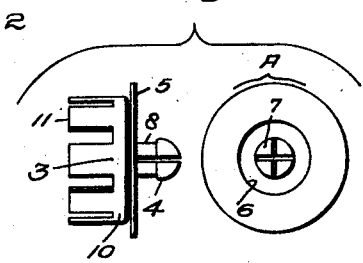
Fig. 3 is a side elevation and a front view respectively of the fastener unit shown in Figs. 1 and 2.

Referring first to Figs. 1 through 3 I have shown a portion of a frame 1 to which is attached an upholstered backing 2 by means of a stud unit A secured to the upholstered backing 2, as shown in Fig. 1. The construction of the frame 1, upholstered backing 2 and fastening means is so well-known that it is unnecessary to go into a detailed description of these parts. Therefore, I shall describe only the fastener unit A and its novel features.

The fastener unit A has a one-piece pressed metal casing part or fastener carrying and attaching part 3 and a one-piece stud member 4. The fastener carrying and attaching part has a flange portion 5 provided with a continuous outer peripheral portion. The flange portion 5 surrounds an aperture 6 through which the head 7 and neck 8 of the stud pass. From the inner edge of the flange portion 5 material of the carrying and attaching part continues upwardly and outwardly to provide a wall 9 perpendicular to the axis of the unit (Fig. 1) and from the outer edge of the wall 9 the material extends upwardly again to provide an annular wall 10 parallel with the axis of the unit. At the free edge of the wall 10 I have provided a number of attaching prongs 11. Between the prongs 11 I have provided inwardly bent ears 12 (Fig. 2) which are parallel with the wall 9. The ears 11 are spaced from the wall 9 so that the base 12 of the stud may be assembled between the ears 11 and wall, as best shown in Fig. 1. The diameter of the base 12 of the stud is less than the diameter of the space enclosed by the wall 10 so that the stud may shift to a limited extent in any lateral direction relative to the carrying and attaching part.

The fastener unit A is attached to the upholstered backing 2 by inserting the unit into a hole 13, previously formed therein, until the flange portion 5 rests against one face of the backing. Then the attaching prongs 11 are bent outwardly and downwardly against the opposite face of the backing (Fig. 2) so that the base of the stud and substantially all of the stud carrying and attaching part are confined between the two faces of the backing, as best shown in Fig. 1.

Figure 4:
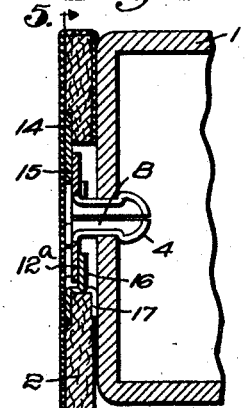
Fig. 4 is an enlarged vertical section taken through an installation showing the manner of use of a second form of fastener unit.
Figure 5:
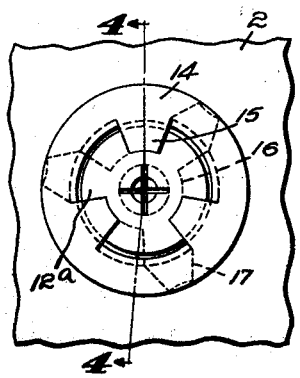
Fig. 5 is a section taken on the line 5—5 of Fig. 4.
Figure 6:
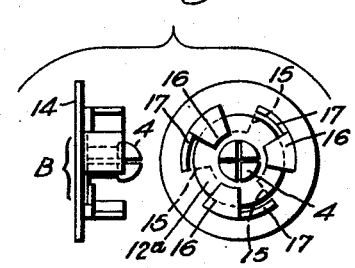
Fig. 6 is a side elevation and a front view respectively of the fastener unit shown in Figs. 4 and 5.

Referring now to Figs. 4 through 6 I have shown an installation which is substantially the same as that shown in Figs. 1 and 2. In this installation the stud holding and attaching part is of slightly different construction. Therefore, I shall designate the fastener unit shown in Figs. 4 through 6 as the stud unit B.

The stud carrying and attaching part of the unit B is pressed from a single piece of sheet metal which in its blank form is in the shape of a disc. The disc is cut to provide a number of sets of ears or petals (Figs. 5 and 6) which are for different purposes. These petals are located at the inner edge of a ring-like portion 14 and three of them marked 15 remain in the same plane as the ring-like portion. Three other ears or petals marked 16 are bent at right angles to the ring-like portion 14 and these extend inwardly in spaced parallel relation to the petals 15. These petals 15 and 16 form means for cooperation with the base of the stud to hold the stud in laterally shiftable assembled relation with the stud carrying and attaching part.

The remaining three petals marked 17 extend at right angles to the ring-like portion 14 and provide attaching prongs for assisting in attaching the stud unit B to its carrying medium.

Figure 7:
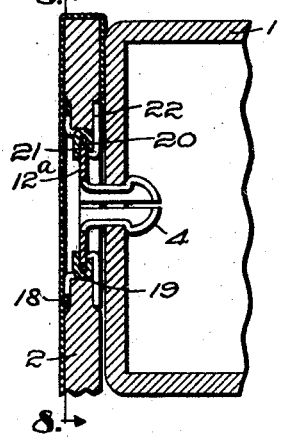
Fig. 7 is an enlarged section taken through an installation to illustrate the use of and manner of attachment of a third form of fastener unit.
Figure 8:
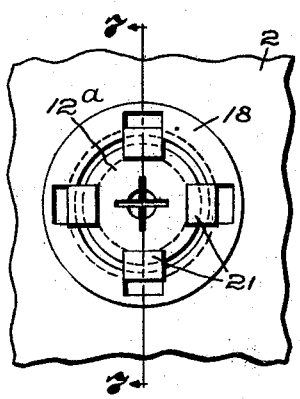
Fig. 8 is a section taken on the line 8—8 of Fig. 7.
Figure 9:
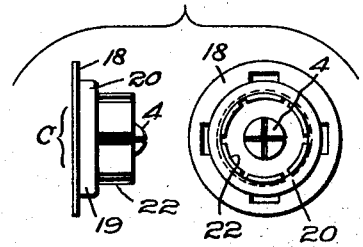
Fig. 9 is a side elevation and an end view respectively of the fastener unit shown in Figs. 7 and 8.

The fastener stud unit C illustrated in Figs. 7 through 9 has a stud carrying and attaching part which is still different in construction from those shown and described in connection with the units A and B. In this instance, I have provided the flange portion 18 with a wall portion 19 at its inner periphery and an inwardly extending wall 20 at the other end of the wall 18, as shown in Figs. 7 and 9. I have also provided a number of ears 21 cut from the flange portion 18 and bent inwardly in spaced parallel relation with the wall 20. Thus the ears 21 and wall 20 provide the means for holding the base of the stud in laterally shiftable relation. Prongs 22 extend from the inner edge of the wall 20 at right angles thereto and are adapted to cooperate with the flange 18 to secure the stud unit C to a support.

It should be noted that in each of the stud units above described the stud carrying and attaching part has an annular flange which extends outwardly beyond the remainder of the part and has a continuous peripheral edge. This flange serves as a part of the attaching means and at the same time provides satisfactory means for permitting feeding of the units in an automatic attaching machine. The units are also simple, durable and inexpensive and therefore are very desirable articles of manufacture.

While I have illustrated and described several embodiments of my invention, I do not wish to be limited thereby as the scope of my invention is best defined in the following claims.

Claims:

1. A fastener unit comprising, in combination, a casing part and a snap fastener element, means engaging said snap fastener element and holding it in assembled relation with said casing part, a continuous flange portion extending laterally outwardly beyond the means engaging the snap fastener element and attaching means formed integral with the casing part and adapted to cooperate with said flange to secure the fastener unit to a support.

2. A fastener unit comprising, in combination, a stud holding and attaching part and a fastener stud secured thereto, said stud having a head, a neck and a base and said stud holding part having means engaging the base of the stud to hold the stud in assembly with the stud holding and attaching part, a continuous flange extending laterally outwardly beyond the means engaging the stud base and a number of attaching prongs extending parallel with the axis of the stud and adapted to be bent outwardly to cooperate with said continuous flange and secure the fastener unit to a support.

3. A fastener unit comprising, in combination, a stud holding and attaching part and a fastener stud secured thereto, said stud having a head, a neck and a base and said stud holding part having means engaging the base of the stud to hold the stud in assembly with the stud holding and attaching part, a continuous flange extending laterally outwardly beyond the means engaging the stud base, a number of attaching prongs extending parallel with the axis of the stud and adapted to be bent outwardly to cooperate with said continuous flange and secure the fastener unit to a support and means permitting lateral shifting of the stud in any direction relative to the stud holding and attaching part.

4. A fastener unit comprising, in combination, a one-piece stud holding and attaching part and a fastener stud secured thereto, said stud having a head, a neck and a base and said stud holding part having means engaging the base of the stud to hold the stud in assembly with the stud holding and attaching part, a continuous flange extending laterally outwardly beyond the means engaging the stud base and a number of attaching prongs extending parallel with the axis of the stud and adapted to be bent outwardly to cooperate with said continuous flange and secure the fastener unit to a support.

In testimony whereof, I have signed my name to this specification.

DIDRICK DYRESEN.